(12) United States Patent
Segal

(10) Patent No.: US 6,791,567 B1
(45) Date of Patent: Sep. 14, 2004

(54) METHOD AND SYSTEM FOR COLOR CLIPPING FOR EXTREMELY BRIGHT IMAGES

(75) Inventor: Peter Segal, Exton, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 09/671,732

(22) Filed: Sep. 29, 2000

(51) Int. Cl.[7] .................................................. G09G 5/02
(52) U.S. Cl. ...................... 345/590; 345/589; 345/591; 345/592; 345/593
(58) Field of Search ................................ 345/589–593, 345/600, 605

(56) References Cited

U.S. PATENT DOCUMENTS 6,453,067 B1 * 9/2002 Morgan et al. .............. 382/162

* cited by examiner

Primary Examiner—Matthew C. Bella
Assistant Examiner—Tam Tran
(74) Attorney, Agent, or Firm—Posz & Bethards, PLC

(57) ABSTRACT

A method and system for color clipping, taking into account the actual color of the surface, while still giving the appearance of a very bright surface that does not result in a washed-out image. A maximum value of the color component is determined. A ratio of the maximum value to a maximum allowable value is determined. A scaling factor is determined based on the determined ratio. The value to be color clipped is set to a value including the scaling factor. The scaling factor is non-linear, for example, logarithmic.

In one embodiment, determining the scaling factor further includes computing the scaling factor as the $\text{Log}_{10}$ of the ratio; or includes adding the value 1 to the scaling factor, and multiplying by a variable scale factor.

The color-clipped image is then displayed.

29 Claims, 5 Drawing Sheets

METHOD AND SYSTEM FOR COLOR CLIPPING FOR EXTREMELY BRIGHT IMAGES

BACKGROUND OF THE INVENTION

1. Field of the Invention

The invention generally relates to displaying surfaces of images. More specifically, the invention relates to color clipping of extremely bright images, taking into account surface color and texture, while giving the appearance of a very bright surface.

2. Description of the Related Art

In rendered images such as those created using radiosity, particle traced, or ray traced images, multiple or bright lights can cause a pixel of an image to exceed the maximum allowable value. Conventionally, a very bright pixel, which exceeds the maximum value, will simply be clipped to the maximum value. This usually causes the pixel to be displayed as white, regardless of the actual color of the surface. Therefore, a surface of an image in a very bright lighting environment as displayed is substantially or entirely white.

For years, users have complained that the conventional, existing approach of simply clipping the pixel to the maximum value has caused images to appear washed out. For example, radiosity images with sunlight might appear to be washed out.

FIG. 1 is an illustration of the prior art approach to color clipping. Here, virtually the entire surface is extremely bright, and the value of each pixel in the surface exceeds the maximum allowable value. Using the conventional approach, each pixel is simply clipped to the maximum value. Thus, although the actual values of the pixels are different, after conventional color clipping, virtually all of the pixels all have the same bright value. Note that the surface image appears so washed-out as to be substantially white.

FIG. 3 also illustrates the conventional prior art approach. It is the same image as FIG. 1, scaled by 1/2 to illustrate more detail. In this illustration, although the surface is very bright, many of the pixel values are just below the maximum value. After conventional color clipping, pixels in large sections of the image all have the same bright value, so that there is no detail in those areas. Moreover, even in the areas that have some pixels below the maximum value, details are lost. Again, even though only certain portions of the image exceed maximum values, the image as a whole appears to be washed-out and unclear.

Thus, there remains a need for color clipping that does not result in a washed-out image. Further, there is a need for color clipping that takes into account color and other features of the surface, while still giving the appearance of an extremely bright image.

BRIEF SUMMARY OF THE INVENTION

According to the present invention, color clipping takes into account the actual color of the surface, including texture mapping, while still giving the appearance of a very bright surface. Further, the invention provides color clipping that does not result in a washed-out image. According to the invention, there is provided a method and system for color clipping an image to be displayed, the image having at least one value to be color clipped.

The method and system includes determining a maximum value of at least one color component for at least one value. Also included is determining a ratio of the maximum value to a maximum allowable value. A scaling factor is determined based on the determined ratio. The value to be color clipped is set to a value including the scaling factor.

In one embodiment, the scaling factor is non-linear. In another embodiment, the scaling factor is logarithmic.

In an embodiment, the value is color components of at least one pixel.

In one variation, the image to be displayed includes at least one surface, and there are provided a plurality of values to be color clipped.

In another embodiment, determining the maximum value includes obtaining the value of each color component, and determining the maximum value of the obtained values. In yet another embodiment, determining the ratio further includes obtaining the maximum allowable value. In another embodiment, determining the scaling factor further includes computing the scaling factor as the $\text{Log}_{10}$ of the ratio; or includes adding the value 1 to the scaling factor, and multiplying by a variable scale factor.

In another embodiment, setting the value to be color clipped includes determining the value including the scaling factor to be:

$$\text{Max}_{Pixel} - \text{Max}_{Pixel} * (x - \text{Color}/\text{Max}_{Component})^{scaling\ factor}$$

In one variation, $(x - \text{Color}/\text{Max}_{Component})$ is positive. In another variation, the scaling factor is non-linear.

The system and method further include displaying the image to be displayed, the image including the color-clipped value.

These and other objects, features and advantages of the present invention are readily apparent from the following drawings and detailed description.

BRIEF DESCRIPTION OF THE DRAWINGS

The invention is described in connection with the drawings, in which.

DETAILED DESCRIPTION OF THE PREFERRED EMBODIMENT

The present invention compares the actual color and brightness of the pixel to the maximum value. The ratio of the largest value to the maximum value is used as a basis for an exponential scaling of the pixel value.

To scale the color of a pixel while maintaining the appearance of a bright surface, the preferred embodiment includes the following:

1. Compute the maximum value of all the color components (for example, RGB) of the pixel.
2. Compute the ratio of the maximum value ($\text{Max}_{Component}$) to the maximum allowable value ($\text{Max}_{Pixel}$).
3. Compute the Exponent as the $\text{Log}_{10}$ of the ratio, add 1, and multiply by a variable scaling constant (or 1 if not specified).

4. For each color component, set the pixel value to the scaled pixel value as follows:

$$Max_{Pixel} - Max_{Pixel} * (1.0001 - Color/Max_{Component})^{Exponent}$$

where Color is the predetermined value of the color as computed by the rendering algorithm. The preferred value, 1.0001, is used to ensure that (1−Color/Max) is positive. Roundoff error could cause color/max to be ever so slightly >1, but (1.0001−Color/Max) will always be positive. The principle is to utilize (1.0+ epsilon−Color/Max), where epsilon is some small roundoff prevention number.

Generally, the color clipping will be done at display time. Further, it can be performed for one or more selected surfaces, or for all surfaces.

Figure 1:
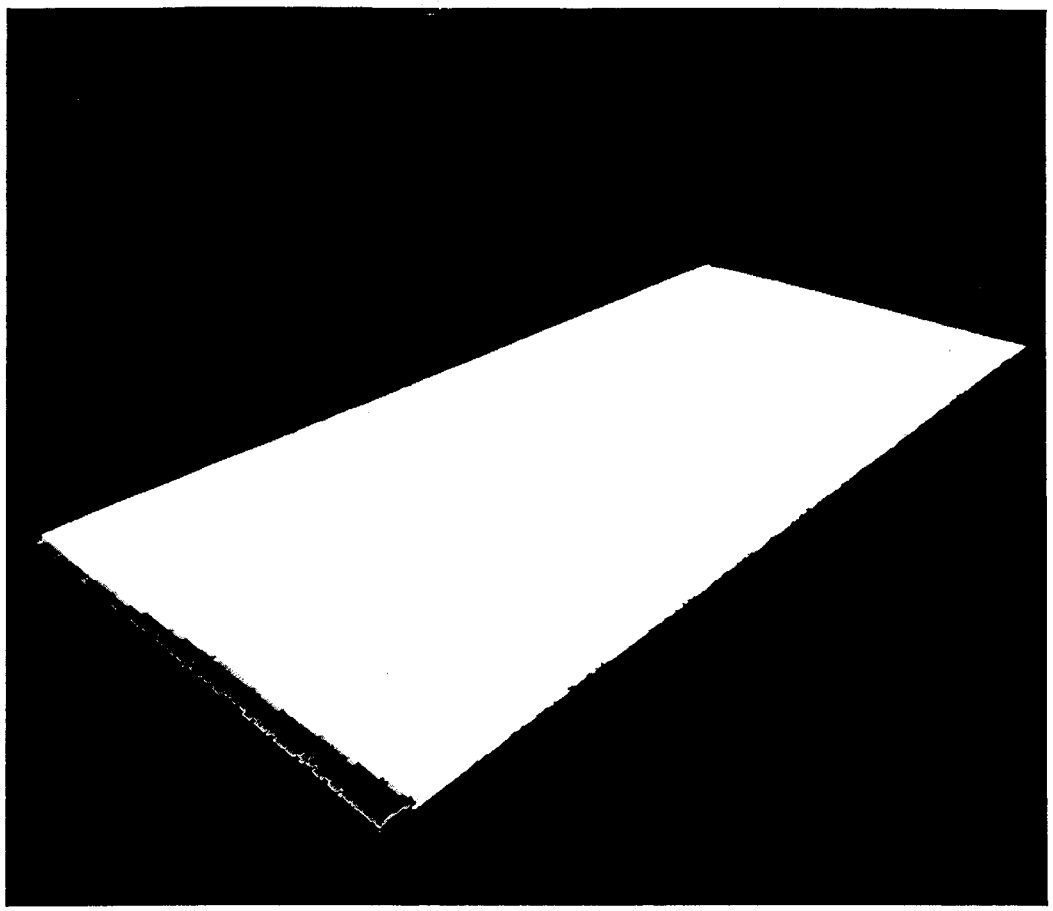
FIG. 1 is an example of prior art color clipping illustrating the washout of an extremely bright image.
Figure 2:
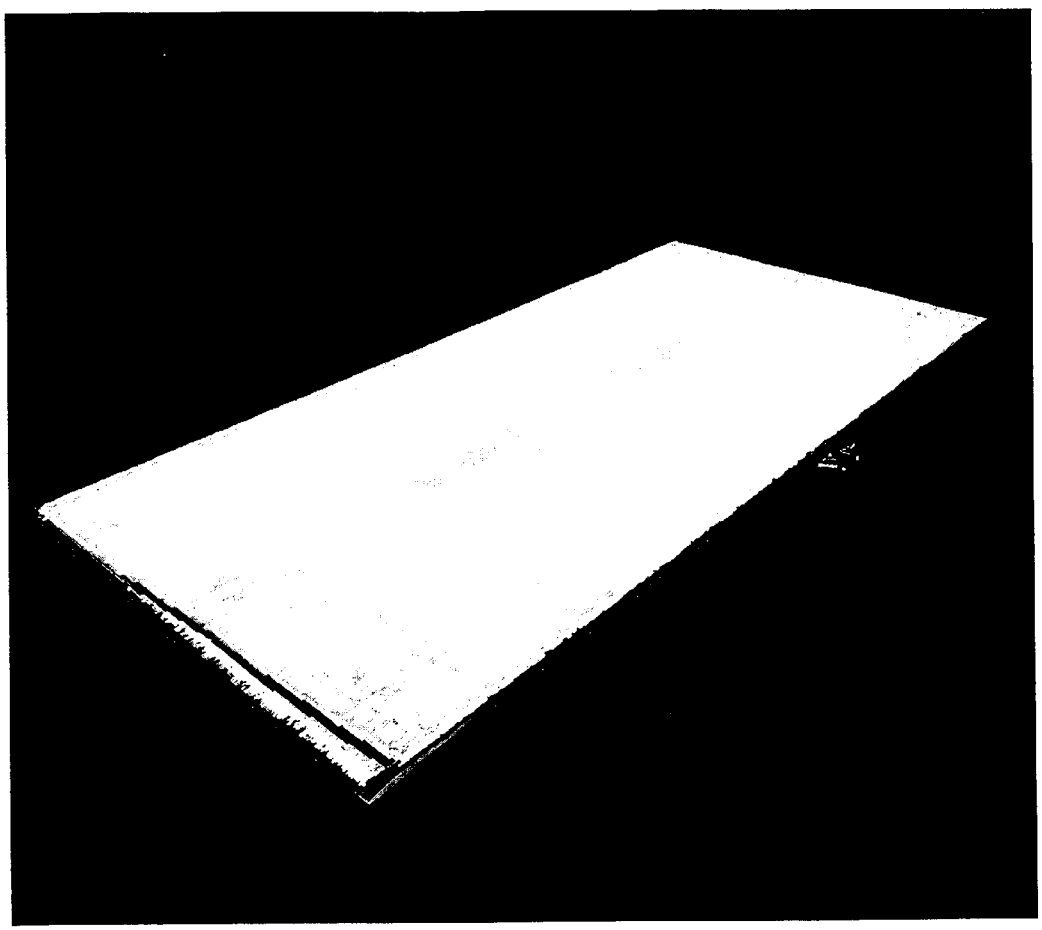
FIG. 2 is an example of the present invention color clipping showing detail in the extremely bright image of FIG. 1.
Figure 3:
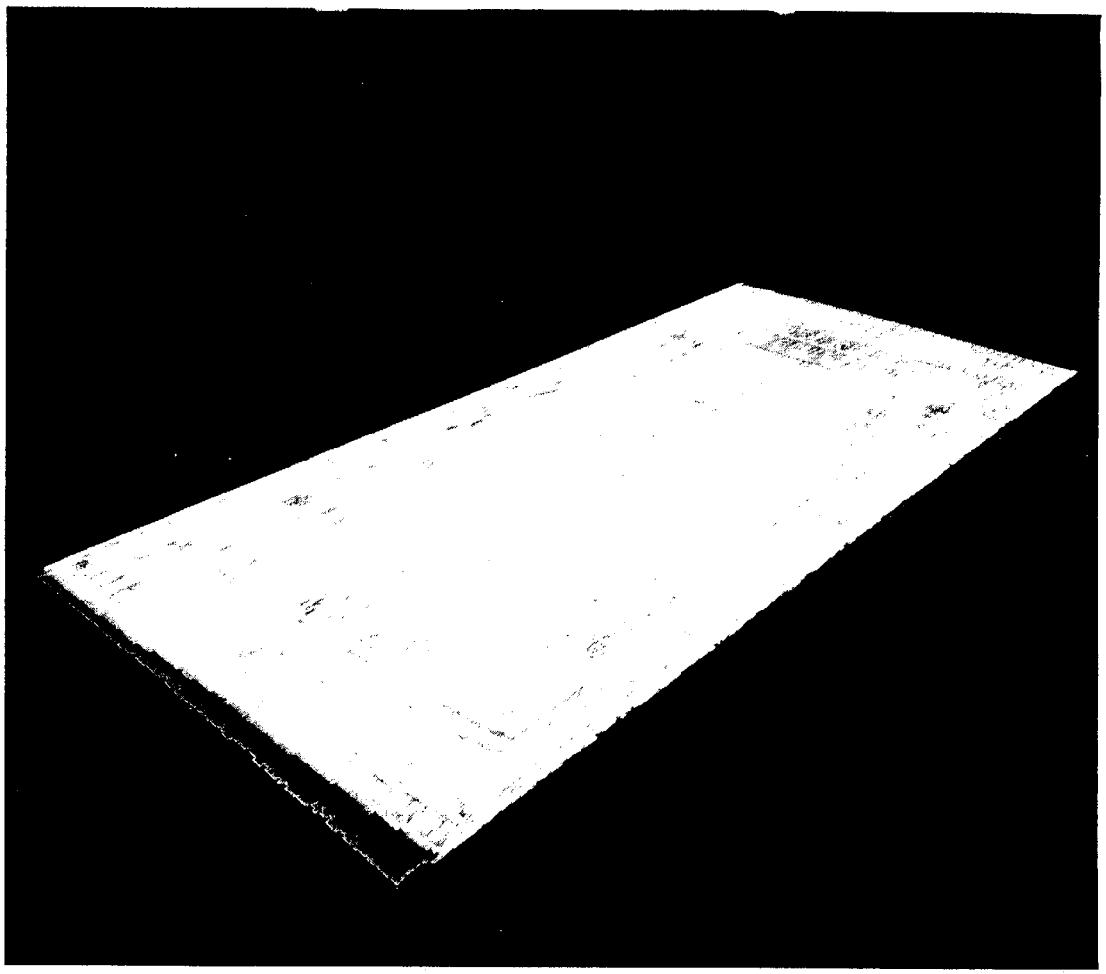
FIG. 3 is an example of prior art color clipping, scaled by 1/2, illustrating the washout of the extremely bright image of FIG. 1.
Figure 4:
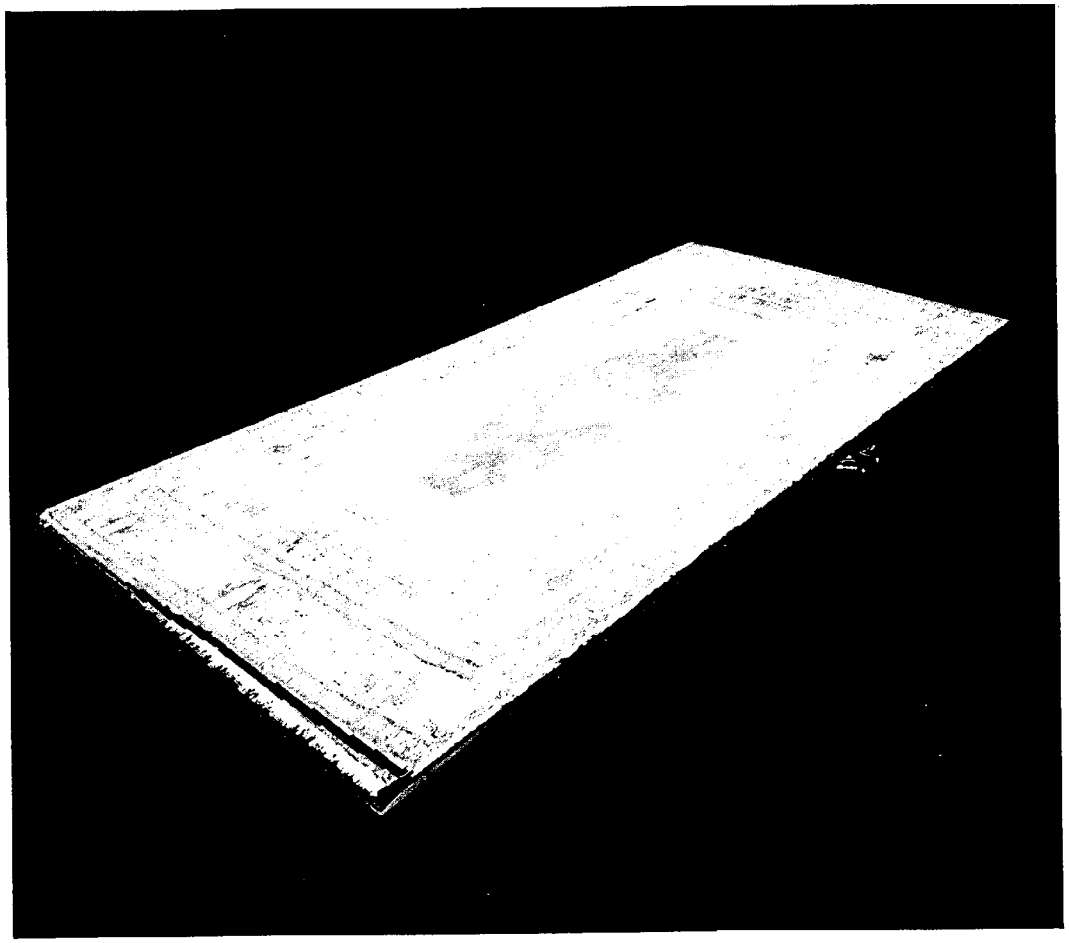
FIG. 4 is an example of the present invention color clipping, scaled by 1/2, showing detail in the extremely bright image of FIG. 3.

FIGS. 2 and 4 are examples showing the improvement of the present invention compared to prior art conventional color clipping, illustrated in FIGS. 1 and 3, respectively. FIG. 2 shows the same example surface as in FIG. 1, however displayed using the present invention's color clipping. FIG. 4 is a view of the present invention color clipping, scaled by 1/2, showing detail in the extremely bright image of FIG. 3. In both FIGS. 2 and 4, the image is much less washed out and shows much more surface detail than the same image in FIGS. 1 and 3.

In accordance with the invention, a surface is to be displayed. Values for the surface, such as color and texture, previously have been determined.

The actual color and brightness of each pixel in the surface is compared to a maximum allowable value. In this specific example, the maximum allowable value is determined by the display algorithm being used. For Z-buffered rendering algorithms, the maximum value will typically be 255.0, or the maximum value of an individual color component in the display technology being used. In modern day display hardware and software, this is typically 8 bits per color, for a maximum value of 255. If 10 bits per color were available, for example, the maximum value would be 1023.0, and so on. When antialiasing, it is often preferable to keep the color ranges in the zero to one range. In this case, one would use a maximum value of 1.0, and scale the color by the maximum displayable value at a later time.

A ratio of the largest value (or maximum value) to the maximum allowable value is used as a basis for a non-linear scaling of the pixel value. For example, if the maximum allowable value is 255 and the largest value for the particular pixel is 510, the ratio is 510/255 or 2.0. The ratio is determined for each pixel of the image as it is being rendered.

Next, a non-linear function is used to perform non-linear scaling of the pixel value. Any non-linear function is appropriate, since the non-linear scaling causes the relatively bright areas to appear even brighter, and the relatively darker areas to appear even darker. A $Log_{10}$ scale is preferred. This function can be further modified by a user supplied multiplier, that will attenuate or accentuate the degree of color clipping applied. Larger values of the multiplier (greater than 1) will compress the clipping range, forcing values to white faster, decreasing the color detail. Smaller values (smaller than 1) will stretch the clipping, showing more color detail, but decreasing the appearance of brightness.

Figure 5:
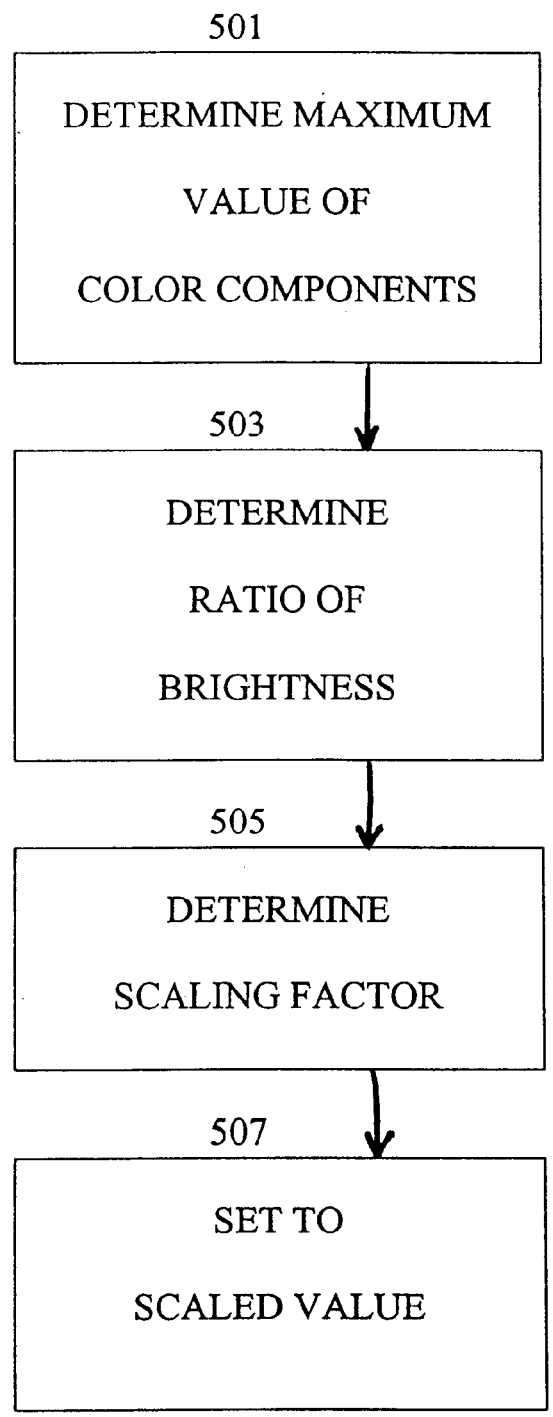
FIG. 5 is a flow chart showing color clipping of extremely bright images, according to the invention.

Reference is made to FIG. 5. Generally, color clipping of extremely bright images so as to avoid washout includes steps 501, 503, 505, 507.

1. At step 501, the maximum value of the color components is determined for the current pixel. The value of the components to be color clipped is obtained, and the maximum value of the components is determined. The components of the color are determined by the color space of the algorithm. Typically this is the RGB color space, where the color components are Red, Green, and Blue. This could also be XYZ space, or any other multi-channel color space, in which case the appropriate color components would be selected.

2. At step 503, the ratio of brightness is determined. The ratio of the maximum actual value ($Max_{Component}$) to the maximum allowable value ($Max_{Pixel}$) is determined. This step determines how far the maximum actual value is outside the allowable range. In the preferred embodiment, a ratio is used, thus readily handling values inside and outside the allowable range. The ratio of brightness can be used without the scaling factor of step 505, however, images that simply use the ratio of brightness do not adequately convey the sense of a very bright scene.

3. At step 505, the scaling factor is determined. Preferably, the scaling factor is non-linear. More specifically, the non-linear scaling factor is $Log_{10}$ of the computed ratio, plus 1, and the resulting sum is multiplied by a user-specified variable scale factor. However, any logarithmic scale or non-linear function would be appropriate.

4. At step 507, the value is set to a scaled value. For each color component, the value of the components to be clipped is scaled utilizing the determined scaling factor.

In summary, the brightness ratio has been determined, and the pre-determined value of the component is scaled downward in a non-linear fashion. The entire surface thus is below the maximum value, but the sense of brightness is retained.

The following is a very simple example of color clipping according to the preferred embodiment of the invention. The values of a very bright surface have already been determined. Table 1 shows the values of the very bright surface which will benefit from color clipping:

TABLE 1

| Sample Pixel Value | |
| --- | --- |
| Red | 637.5 |
| Green | 510.0 |
| Blue | 382.5 |

The following steps are performed for each pixel in the very bright surface.

First, the maximum value ($Max_{Component}$) of the RGB color components of the pixel is computed. The maximum value ($Max_{Component}$) for the pixel in the example of Table 1 is 637.5.

Second, the ratio of the maximum value ($Max_{Component}$) to the maximum allowable value ($Max_{Pixel}$) is computed. In this example, the value of $Max_{Pixel}$ is 255.0. The computed ratio for the pixel in the example of Table 1 is 2.5.

Third, the Exponent is computed as the $Log_{10}$ of the ratio, 1 is added, and multiplied by the user selected scalar, 1.0. The Exponent for the pixel in the example of Table 1 is 1.39794.

Fourth, for each color component, the pixel value of the surface is set to the scaled pixel value as follows:

$$Max_{Pixel} - Max_{Pixel} * (1.0001 - Color/Max_{Component})^{Exponent}$$

The resulting scaled pixel value for the pixel in the example of Table 1 are shown in Table 2:

TABLE 2

| Resulting color clipping | |
| --- | --- |
| Red | 255 |
| Green | 228 |
| Blue | 184 |

Table 3, in comparison, shows the example of Table 1 utilizing a conventional approach:

TABLE 3

Traditional clipping algorithm

| | |
|---|---|
| Red | 255 |
| Green | 255 |
| Blue | 255 |

Color clipping has been described above principally in connection with pixels. Where the color clipping is used in connection with a ray trace method, the ray trace will typically be on a per pixel basis. However, the color clipping of the invention is not limited to use with pixels or ray tracing. For example, if the color clipping is used in connection with smooth shading, the color clipping could be performed for each vertex of a triangle, or during the rasterization phase for each pixel of the triangle.

Although the preferred embodiment utilized a $Log_{10}$ scale, any non-linear function will result in an improvement of the washed-out extremely bright image. For example, any log scale or other non-linear function is appropriate.

The limited range of pixel values is conventionally 0 to 255. However, since the invention utilizes scaling, the invention makes optimal use of the limited range.

The invention is particularly useful for display of ray traced, particle traced, and radiosity images.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for color clipping an image to be displayed, the image having at least one value to be color clipped, comprising the steps of:
   (A) determining a maximum value of at least one color component for the at least one value;
   (B) determining a ratio of the maximum value to a maximum allowable value;
   (C) determining a scaling factor based on the determined ratio;
   (D) setting the value to be color clipped to a value including the scaling factor; and
   (E) wherein step (D) includes determining the value including the scaling factor to be;

$$Max_{Pixel} - Max_{Pixel} * (x - Color/Max_{Component})^{scaling\ factor}.$$

2. The method of claim 1, wherein the scaling factor is non-linear.

3. The method of claim 1, wherein the scaling factor is logarithmic.

4. The method of claim 1, wherein the at least one value is color components of at least one pixel.

5. The method of claim 4, wherein the image to be displayed includes at least one surface, and wherein there are provided a plurality of values to be color clipped.

6. The method of claim 1, wherein step (A) further comprises obtaining the value of each of the at least one color components, and determining the maximum value of the obtained values.

7. The method of claim 1, wherein step (B) further comprises obtaining the maximum allowable value.

8. The method of claim 1, wherein step (C) further comprises computing the scaling factor as the $Log_{10}$ of the ratio.

9. The method of claim 8, wherein step (C) further comprises adding the value 1 to the scaling factor, and multiplying by a variable scale factor.

10. The method of claim 1, wherein (x−Color/$Max_{Component}$) is positive.

11. The method of claim 1, wherein the scaling factor is non-linear.

12. The method of claim 1, further comprising the step of displaying the image to be displayed, the image including the color-clipped value.

13. The method of claim 1, wherein there are a plurality of values to be color clipped.

14. A system for color clipping an image to be displayed, implemented in hardware or computer software, the image having at least one value to be color clipped, comprising:
   (A) logic for determining a maximum value of at least one color component of at least one pixel, for at least one value to be color clipped;
   (B) logic for determining a ratio of the maximum value to a maximum allowable value, for the at least one pixel, responsive to the maximum value for the at least one value to be color clipped;
   (C) logic for using a scaling factor based on the determined ratio, responsive to the determined ratio, for the at least one value of the pixel to be color clipped;
   (D) logic for displaying an image on a display, the image having a value including the scaling factor, for the at least one value to be color clipped; and
   (E) wherein the at least one pixel in the image has a value including the scaling factor determined according to:

$$Max_{Pixel} - Max_{Pixel} * (x - Color/Max_{Component})^{scaling\ factor}.$$

15. The system of claim 14, wherein the scaling factor is non-linear.

16. The system of claim 14, wherein the scaling factor is logarithmic.

17. The system of claim 14, wherein the at least one value is color components of at least one pixel.

18. The system of claim 17, wherein the image to be displayed includes at least one surface, and wherein there are provided a plurality of values to be color clipped.

19. The system of claim 14, further comprising a stored value of each of the at least one color components.

20. The system of claim 14, wherein the scaling factor includes the $Log_{10}$ of the ratio.

21. The system of claim 20, wherein the value 1 is added to the scaling factor, and multiplying by a variable scale factor.

22. The system of claim 14, wherein (x−Color/MaxComponent) is positive.

23. The system of claim 14, wherein the scaling factor is non-linear.

24. The system of claim 14, further comprising the image to be displayed, the image including the color-clipped value.

25. The system of claim 14, wherein there are a plurality of values to be color clipped.

26. A method for color clipping an image to be displayed, the image including at least one surface, having a plurality of values to be color clipped, comprising the steps of:
   (A) determining a maximum value of at least one color component for the at least one value, including obtaining the value of each of the at least one color components and determining the maximum value of the obtained values;
   (B) obtaining the maximum allowable value, and determining a ratio of the maximum value to a maximum allowable value;
   (C) determining a scaling factor based on the determined ratio, including computing the scaling factor as the Logo of the ratio; and (D) setting the value to be color clipped to a value including the scaling factor, including determining the value having the scaling factor to be:

$$\text{Max}_{Pixel}-\text{Max}_{Pixel}*(x-\text{Color}/\text{Max}_{Component})^{scaling\ factor}.$$

27. A system for color clipping an image to be displayed, implemented in hardware or computer software, the image including at least one surface, having a plurality of values to be color clipped, comprising:

(A) logic for determining a maximum value of at least one color component of at least one pixel for the plurality of values, and a stored value of the at least one color component;

(B) logic for determining a maximum allowable value, and a ratio of the maximum value to the maximum allowable value for the at least one pixel, responsive to the maximum value;

(C) logic for using a scaling factor based on the determined ratio, based on the determined ratio, wherein the scaling factor is based on the Log to of the ratio; and (D) logic for displaying an image on a display, the at least one pixel in the image having the value to be color clipped set to a value including the scaling factor, wherein value having the scaling factor has been determined according to:

$$\text{Max}_{Pixel}-\text{Max}_{Pixel}*(x-\text{Color}/\text{Max}_{Component})^{scaling\ factor}.$$

28. The system of claim 14, further comprising a computer-readable medium with the logic of (A), (B), (C) and (D) thereon.

29. The system of claim 27, further comprising a computer-readable medium with the logic of (A), (B), (C) and (D) thereon.

* * * * *